US010961002B2

(12) United States Patent
Mueggenborg et al.

(10) Patent No.: US 10,961,002 B2
(45) Date of Patent: Mar. 30, 2021

(54) POWDER MATERIAL HOPPER SYSTEM WITH OFFSET LOADING

(71) Applicant: Ecolab USA Inc., St. Paul, MN (US)

(72) Inventors: Brock Stephen Mueggenborg, St. Paul, MN (US); Karl Heinbuch, Roberts, WI (US); Daniel Davis Anderson, Eagan, MN (US); David W. Scheimann, Joliet, IL (US); Thomas E. Peacock, Elburn, IL (US)

(73) Assignee: Ecolab USA Inc., St. Paul, MN (US)

( * ) Notice: Subject to any disclaimer, the term of this patent is extended or adjusted under 35 U.S.C. 154(b) by 32 days.

(21) Appl. No.: 16/207,844

(22) Filed: Dec. 3, 2018

(65) Prior Publication Data
US 2019/0168901 A1 Jun. 6, 2019

Related U.S. Application Data

(60) Provisional application No. 62/594,316, filed on Dec. 4, 2017.

(51) Int. Cl.
B65B 37/02 (2006.01)
B65D 88/26 (2006.01)
B65G 69/04 (2006.01)

(52) U.S. Cl.
CPC .............. B65B 37/02 (2013.01); B65D 88/26 (2013.01); B65G 69/0441 (2013.01)

(58) Field of Classification Search
CPC ...... B65B 37/02; B65D 88/26; B65G 69/0441
See application file for complete search history.

(56) References Cited

U.S. PATENT DOCUMENTS 2,029,219 A 1/1936 Bourland
2,105,589 A 1/1938 Eades
(Continued)

FOREIGN PATENT DOCUMENTS

CA 1306979 C 9/1992
CA 2152088 A1 7/1994
(Continued)

OTHER PUBLICATIONS

European Patent Office, International Search Report in International Patent Application No. PCT/US2018/063609, 6 pp. (dated Mar. 19, 2019).

(Continued)

Primary Examiner — Craig M Schneider
Assistant Examiner — Jason K Niesz
(74) Attorney, Agent, or Firm — Leydig, Voit & Mayer, Ltd.

(57) ABSTRACT

A hopper system for powder material includes a hopper and a cover. The hopper has hopper sidewalls that extend downward from an upper end of the hopper with at least one of the hopper sidewalls being sloped along a portion thereof. A hopper axis extends vertically between at least some of the hopper sidewalls. The cover is disposed at the upper end of the hopper and includes an opening configured for the powder material to flow therethrough and into the hopper. The opening defines a vertical material loading axis that is offset relative to the hopper axis. A diverter member may be provided that is positioned along the material loading axis and configured to divert the powder material entering through the opening. A powder material feed system may be disposed adjacent the lower end of the hopper to feed the powder material from the hopper.

20 Claims, 11 Drawing Sheets

(56) References Cited

U.S. PATENT DOCUMENTS

| | | |
|---|---|---|
| 3,225,963 A | 12/1965 | Arpajian |
| 3,239,111 A | 3/1966 | La Croce |
| 3,308,995 A | 3/1967 | Lee et al. |
| 3,327,905 A | 6/1967 | Gould |
| 3,635,326 A | 1/1972 | Langlinais |
| 3,773,221 A | 11/1973 | Lesk et al. |
| 3,880,300 A | 4/1975 | Uhl |
| 4,021,021 A | 5/1977 | Hall et al. |
| 4,095,723 A | 6/1978 | Lerner |
| 4,212,415 A | 6/1980 | Neely |
| 4,274,563 A | 6/1981 | Otterson |
| 4,349,157 A | 9/1982 | Beiswenger et al. |
| 4,366,920 A | 1/1983 | Greenfield, Jr. et al. |
| 4,376,497 A | 3/1983 | Mumford |
| 4,429,815 A | 2/1984 | Libit |
| 4,548,331 A | 10/1985 | Montgomery |
| 4,586,459 A | 5/1986 | Schultz |
| 4,613,063 A | 9/1986 | Wright |
| 4,828,130 A | 5/1989 | Hofmann |
| RE33,083 E | 10/1989 | Pellegrino |
| 4,892,233 A | 1/1990 | Zelickson |
| 5,172,740 A | 12/1992 | Simmel et al. |
| 5,261,432 A | 11/1993 | Sandrin |
| 5,303,998 A | 4/1994 | Whitlatch et al. |
| 5,322,085 A | 6/1994 | Prothe |
| 5,407,107 A | 4/1995 | Smith |
| 5,495,962 A | 3/1996 | Nomura |
| 5,513,776 A | 5/1996 | Canini |
| 5,582,162 A | 12/1996 | Petersson |
| 5,601,213 A | 2/1997 | Daniello |
| 5,609,458 A | 3/1997 | Hanaoka et al. |
| 5,687,782 A | 11/1997 | Cleveland et al. |
| 5,967,383 A | 10/1999 | Hidalgo |
| 6,050,309 A | 4/2000 | Woodruff |
| 6,085,809 A | 7/2000 | Woodruff |
| 6,179,164 B1 | 1/2001 | Fuchs |
| 6,193,116 B1 | 2/2001 | Sheffler et al. |
| 6,257,172 B1 | 7/2001 | Leppanen |
| 6,283,339 B1 | 9/2001 | Morrow |
| 6,305,443 B1 | 10/2001 | Semenenko |
| 6,311,745 B1 | 11/2001 | Welch et al. |
| D479,801 S | 9/2003 | Carmichael et al. |
| 6,886,719 B1 | 5/2005 | Shen et al. |
| 6,988,642 B2 | 1/2006 | Gallo, Jr. et al. |
| 7,073,546 B2 | 7/2006 | Woodruff |
| 7,438,204 B2 | 10/2008 | Conway et al. |
| 7,980,277 B2 | 7/2011 | Amano |
| D677,987 S | 3/2013 | High |
| 8,833,614 B2 | 9/2014 | Webster et al. |
| 9,139,963 B2 | 9/2015 | Zwahlen et al. |
| 2002/0125275 A1 | 9/2002 | Smith |
| 2002/0145010 A1 | 10/2002 | Ufheil et al. |
| 2002/0145013 A1 | 10/2002 | Chrisman et al. |
| 2003/0159751 A1 | 8/2003 | Chamba |
| 2004/0079765 A1 | 4/2004 | Gallo, Jr. et al. |
| 2005/0103337 A1 | 5/2005 | Hickey et al. |
| 2005/0247742 A1 | 11/2005 | Livingston et al. |
| 2005/0263373 A1 | 12/2005 | Boevers |
| 2006/0027609 A1 | 2/2006 | Landau et al. |
| 2006/0070999 A1 | 4/2006 | Stull et al. |
| 2006/0191958 A1 | 8/2006 | Brundick |
| 2006/0278665 A1 | 12/2006 | Bennett |
| 2007/0034642 A1 | 2/2007 | Pendleton |
| 2007/0084885 A1 | 4/2007 | Conway et al. |
| 2007/0181600 A1 | 8/2007 | Ben-Shlomo et al. |
| 2008/0054014 A1 | 3/2008 | Webster et al. |
| 2008/0072993 A1 | 3/2008 | Luchinger et al. |
| 2008/0093394 A1 | 4/2008 | Peterson et al. |
| 2009/0127289 A1 | 5/2009 | Keller |
| 2009/0145510 A1 | 6/2009 | Luechinger |
| 2009/0188517 A1 | 7/2009 | Thorpe et al. |
| 2009/0188518 A1 | 7/2009 | Thorpe et al. |
| 2009/0258547 A1 | 10/2009 | Pardikes |
| 2009/0309006 A1 | 12/2009 | Johnsgaard |
| 2010/0012120 A1 | 1/2010 | Herder et al. |
| 2010/0204441 A1 | 8/2010 | Pardikes |
| 2011/0099950 A1 | 5/2011 | Dunn et al. |
| 2011/0101023 A1 | 5/2011 | Chan et al. |
| 2012/0080457 A1 | 4/2012 | Lovinger et al. |
| 2012/0267401 A1 | 10/2012 | Schroedter |
| 2013/0167972 A1 | 7/2013 | Peressoni |
| 2014/0103153 A1 | 4/2014 | Below |
| 2014/0166439 A1 | 6/2014 | Hughes |
| 2014/0230963 A1 | 8/2014 | Simon et al. |
| 2015/0021364 A1 | 1/2015 | Zehnder et al. |
| 2018/0128356 A1* | 5/2018 | Koehler ............ B65G 65/4836 |

FOREIGN PATENT DOCUMENTS

| | | |
|---|---|---|
| CA | 2012098 C | 11/1994 |
| CA | 2237351 A1 | 11/1998 |
| CA | 2152088 C | 12/1999 |
| CN | 200981706 Y | 11/2007 |
| CN | 200985145 Y | 12/2007 |
| CN | 201686132 U | 12/2010 |
| CN | 202193332 U | 4/2012 |
| CN | 102923390 A | 2/2013 |
| CN | 104129659 A | 11/2014 |
| CN | 204471651 U | 7/2015 |
| CN | 106926428 A | 7/2017 |
| CN | 107381057 A | 11/2017 |
| EP | 0115321 A2 | 8/1984 |
| EP | 0664667 B1 | 3/1998 |
| EP | 0923993 A1 | 6/1999 |
| EP | 1500911 A1 | 1/2005 |
| EP | 1902956 A1 | 3/2008 |
| EP | 2447186 B1 | 5/2012 |
| EP | 2632302 B2 | 7/2014 |
| GB | 2295609 A | 6/1996 |
| GB | 2296711 A | 7/1996 |
| GB | 2328926 A | 3/1999 |
| GB | 2457110 A | 8/2009 |
| GB | 2457111 A | 8/2009 |
| GB | 2489721 A | 10/2012 |
| JP | H03-216697 A | 9/1991 |
| JP | 4206175 B2 | 1/2009 |
| KR | 2002-0072152 A | 9/2002 |
| NZ | 20060544807 | 11/2007 |
| WO | WO 85/00156 A1 | 1/1985 |
| WO | WO 88/07324 A1 | 10/1988 |
| WO | WO 88/08269 A1 | 11/1988 |
| WO | WO 95/15893 A1 | 6/1995 |
| WO | WO 96/04410 A1 | 2/1996 |
| WO | WO 97/30743 A1 | 8/1997 |
| WO | WO 99/44663 A1 | 9/1999 |
| WO | WO 03/093773 A1 | 11/2003 |
| WO | WO 2004/041435 A2 | 5/2004 |
| WO | WO 2006/119324 A2 | 11/2006 |
| WO | WO 2007/120133 A2 | 10/2007 |
| WO | WO 2007/141601 A1 | 12/2007 |
| WO | WO 2009/050710 A2 | 4/2009 |
| WO | WO 2010/150087 A1 | 12/2010 |
| WO | WO 2013/010702 A1 | 1/2013 |
| WO | WO 2014/031474 A2 | 2/2014 |
| WO | WO 2015/158724 A1 | 10/2015 |
| WO | WO 2016/016649 A1 | 2/2016 |
| WO | WO 2016/019299 A1 | 2/2016 |
| WO | WO 2018/093992 A1 | 5/2018 |
| WO | WO 2018/093995 A1 | 5/2018 |

OTHER PUBLICATIONS

European Patent Office, Written Opinion in International Patent Application No. PCT/US2018/063609, 5 pp. (dated Mar. 19, 2019).

European Patent Office, International Search Report in International Patent Application No. PCT/US2017/061934, 7 pp. (dated Apr. 30, 2018).

European Patent Office, Written Opinion in International Patent Application No. PCT/US2017/061934, 13 pp. (dated Apr. 30, 2018).

\* cited by examiner

POWDER MATERIAL HOPPER SYSTEM WITH OFFSET LOADING

This application is a nonprovisional application claiming the benefit of U.S. Provisional Patent application Ser. No. 62/594,316, filed Dec. 4, 2017, the disclosure of which is incorporated herein by reference in its entirety.

TECHNICAL FIELD

The present disclosure relates generally to hopper systems for powder material and, more particularly, to a hopper system for powder material in which the powder material is loaded along an axis offset from an axis of the hopper.

BACKGROUND

Systems for the makedown of powder material such as dry polymers may include a plurality of units or stations. These stations may include a material storage station, a material supply station in which material is supplied from the storage station, and a mixing station at which the dry polymer is mixed with a liquid such as water. In some instances, a holding station including one or more holding tanks may be provided at which the wetted solution may be held until use.

Powder material used with the makedown process may be stored within containers that are manually manipulated to fill a storage unit at the material storage station. Depending upon the weight of a container and the physical abilities of an operator, lifting and positioning the container at a loading location may be physically challenging.

SUMMARY

An improved hopper system for powder material is provided. The hopper system comprises a hopper, a cover, a diverter member, and powder material feed system. The hopper has an upper end, a lower end, a plurality of hopper sidewalls, and a hopper axis. The hopper sidewalls extend downward from the upper end with at least one of the hopper sidewalls being sloped along a portion thereof. The hopper axis extends vertically between at least some of the hopper sidewalls. The cover is disposed at the upper end of the hopper and includes an opening configured for the powder material to flow through the opening and into the hopper. The opening defines a vertical material loading axis with the material loading axis being offset relative to the hopper axis. The diverter member is at least partially positioned along the material loading axis and configured to divert the powder material as it enters the hopper through the opening. The powder material feed system is disposed adjacent the lower end of the hopper and is configured to feed the powder material from the hopper.

In another aspect, an improved hopper system comprises a hopper, a cover, and a diverter member. The hopper has an upper end, a lower end, a plurality of hopper sidewalls, and a hopper axis. The hopper sidewalls extend downward from the upper end with at least one of the hopper sidewalls being sloped along a portion thereof. The hopper axis extends vertically between at least some of the hopper sidewalls. The cover is disposed at the upper end of the hopper and includes an opening configured for the powder material to flow through the opening and into the hopper. The opening defines a vertical material loading axis with the material loading axis being offset relative to the hopper axis. The diverter member is at least partially positioned along the material loading axis and configured to divert the powder material as it enters the hopper through the opening.

In another aspect, an improved hopper system comprises a hopper, a cover, and powder material feed system. The hopper has an upper end, a lower end, a plurality of hopper sidewalls, a front edge, a back edge, and a hopper axis. The hopper sidewalls extend downward from the upper end with at least one of the hopper sidewalls being sloped along a portion thereof. The hopper axis extends vertically between at least some of the hopper sidewalls and is equidistant between the front edge and the back edge. The cover is disposed at the upper end of the hopper and includes an opening configured for the powder material to flow through the opening and into the hopper. The opening defines a vertical material loading axis with the material loading axis being offset relative to the hopper axis and closer to the front edge than the back edge. The powder material feed system is disposed adjacent the lower end of the hopper and is configured to feed the powder material from the hopper.

DETAILED DESCRIPTION

Figure 1:
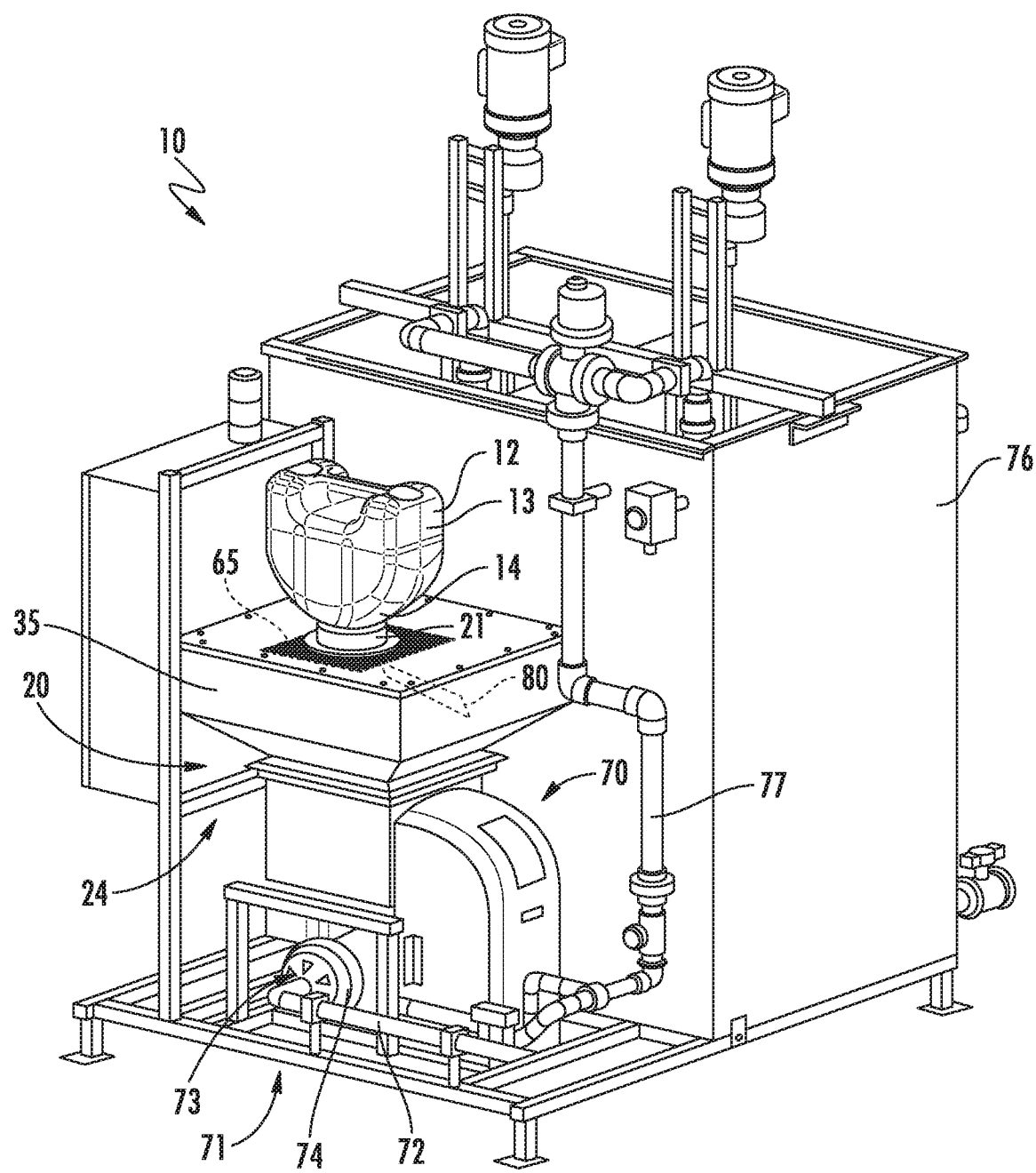
FIG. 1 is a perspective view of a system for processing a dry powder material and forming a homogeneous aqueous liquid substance.

Referring to FIG. 1, a system 10 for processing a powder material, such as a dry polymer, to form a homogeneous aqueous liquid substance is depicted. The system 10 comprises a container 12, a material feed system 20, a material wetting system 70, and a tank 76.

The container 12 is configured to contain and deliver a solid flowable powder material such as a dry polymer. The container 12 may have any desired configuration and, as depicted, includes a closed body section 13 and a tapered section 14 with an opening (not shown) at the bottom through which the material within the container may be discharged.

Figure 2:
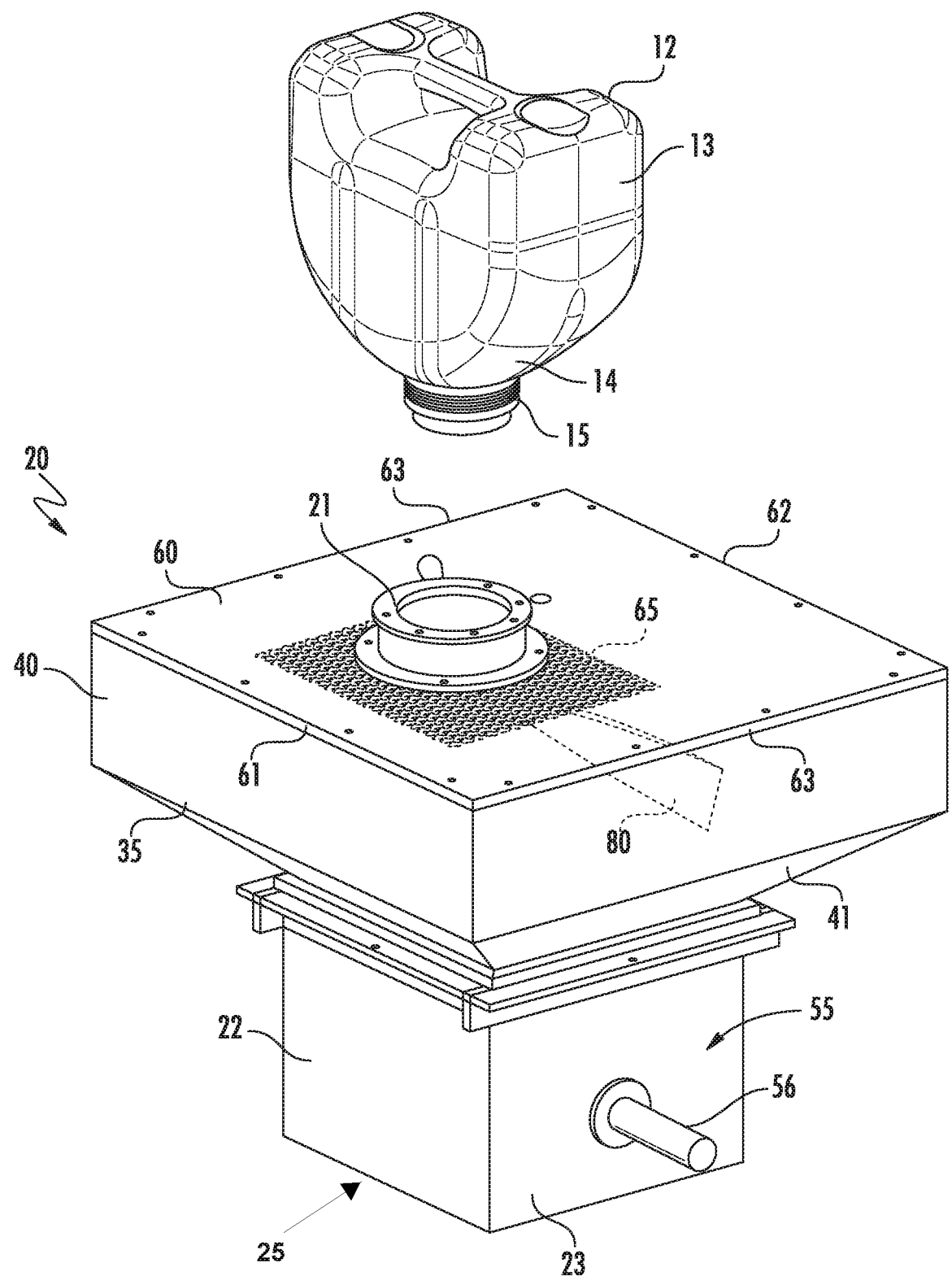
FIG. 2 is a perspective view of the material feed system of the system of FIG. 1 with a powder material container spaced therefrom.

A fitment or valve assembly 15 (FIG. 2) may be secured to the lower end of the tapered section 14 of the container 12 to control the flow of material from the container. The valve assembly 15 may interact with a docking station or base 21 mounted on the material feed system 20 as desired to open and close the valve assembly.

The material feed system 20 includes a housing 22 that supports a hopper 24. As depicted, the hopper 24 is formed of a lower portion or lower hopper 25 (FIG. 7) and an upper portion or hopper extension 35. Forming the hopper 24 of multiple components may simplify the manufacture thereof, and also permit the lower hopper 25 and the hopper extension 35 to be formed with different configurations (e.g., sidewalls having different slopes). However, if desired, the hopper 24 may be formed without a definitive transition between the lower portion and the upper portion without departing from the spirit of the disclosure.

Figure 3:
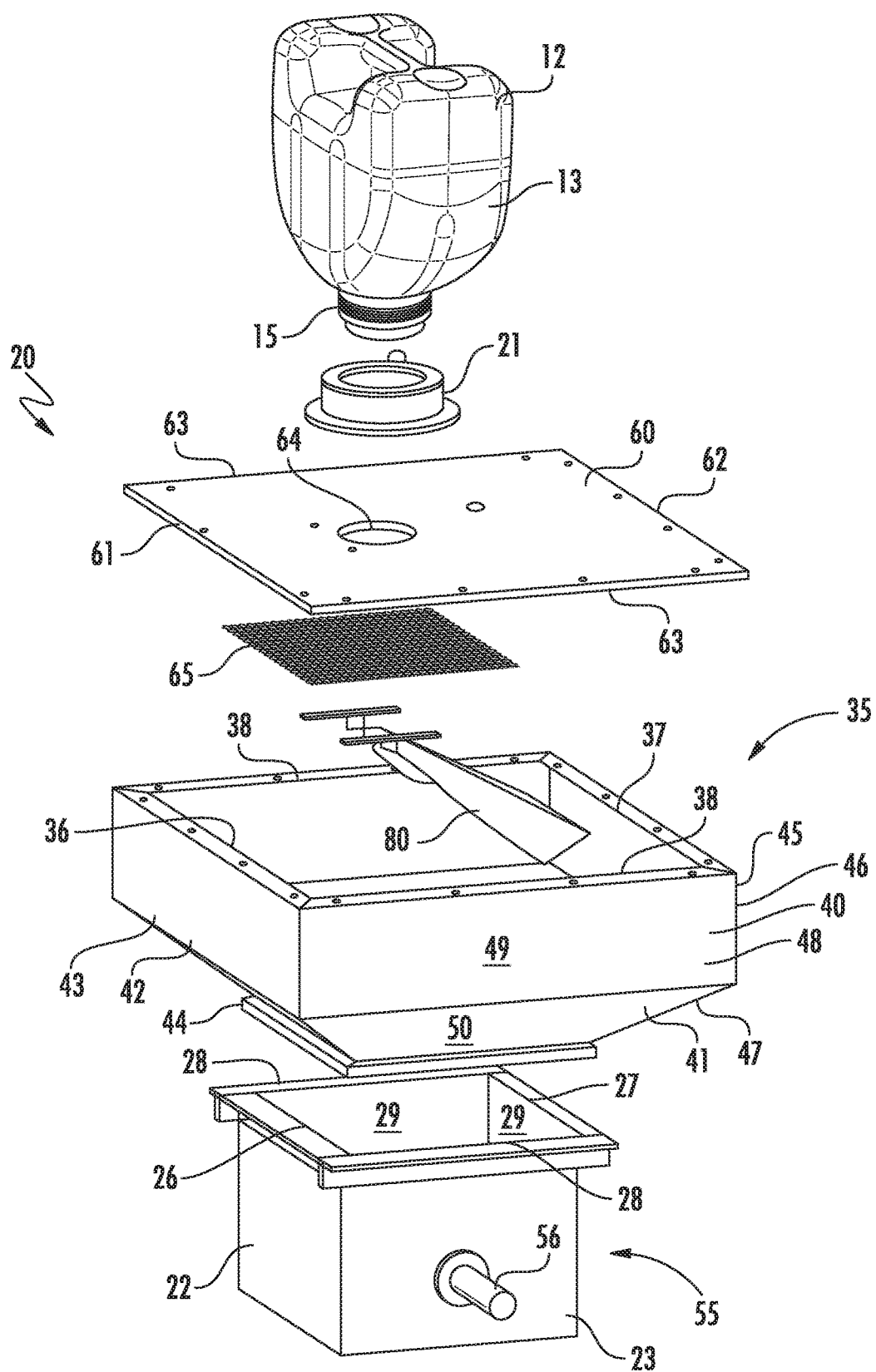
FIG. 3 is an exploded perspective view of the material feed system and container of FIG. 2.
Figure 4:
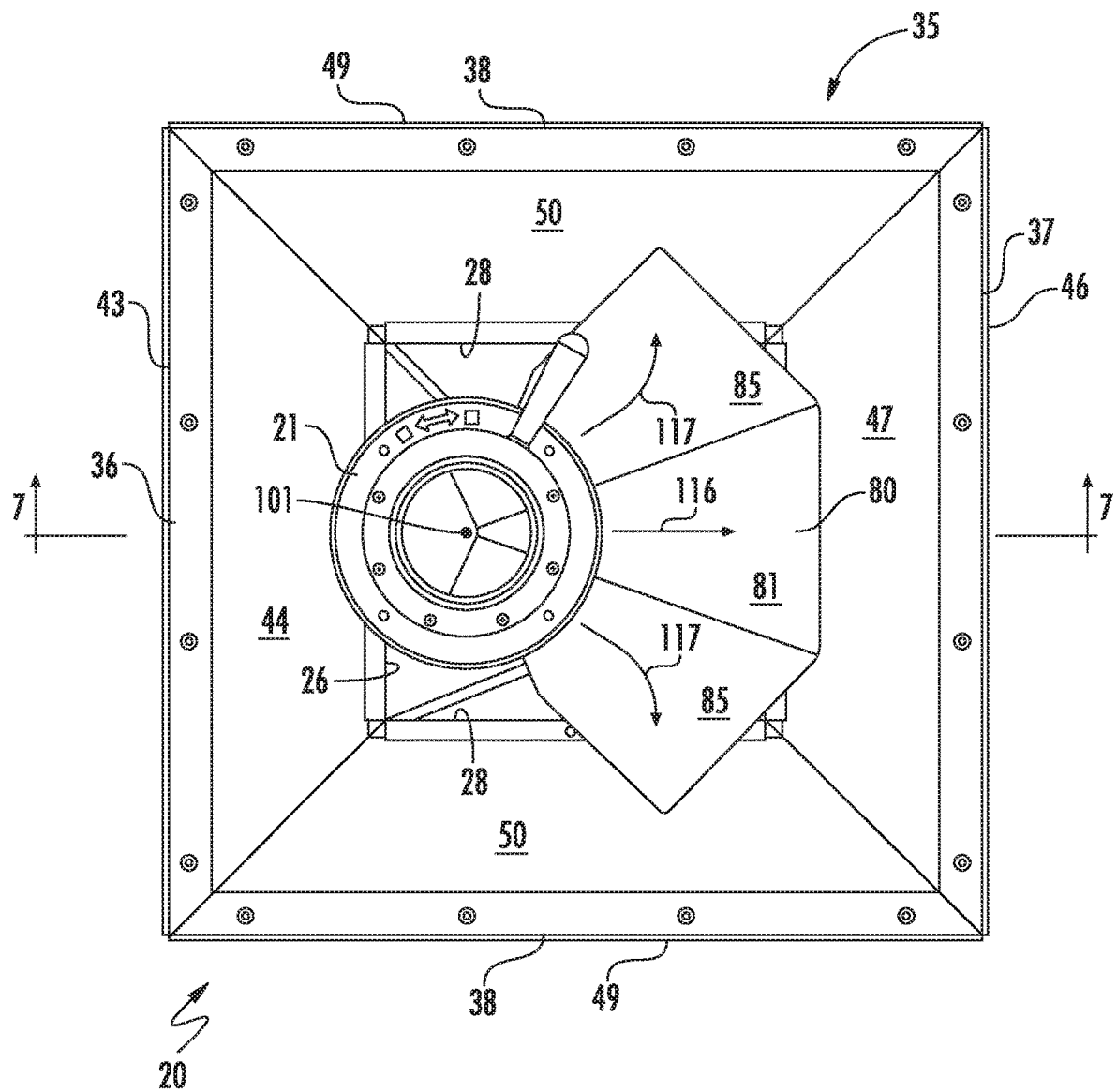
FIG. 4 is a top plan view of the material feed system of FIG. 2 with the cover and mesh removed for clarity.

Referring to FIG. 3, the lower hopper 25 includes a front or loading edge 26, a rear edge 27, opposite the front edge, and spaced apart side edges 28 extending between the front edge and the rear edge. A sloped sidewall 29 extends downwardly from each edge and is configured to direct material passing through the hopper extension 35 to the bottom of the lower hopper 25. As depicted, each of the sidewalls 29 slopes downward in a constant or uniform manner and each of the sidewalls is identically configured so that the lower hopper 25 has a symmetrical shape. If desired, the sidewalls 29 may not have a constant or uniform slope and each of the sidewalls may not be identically shaped or configured.

Figure 7:
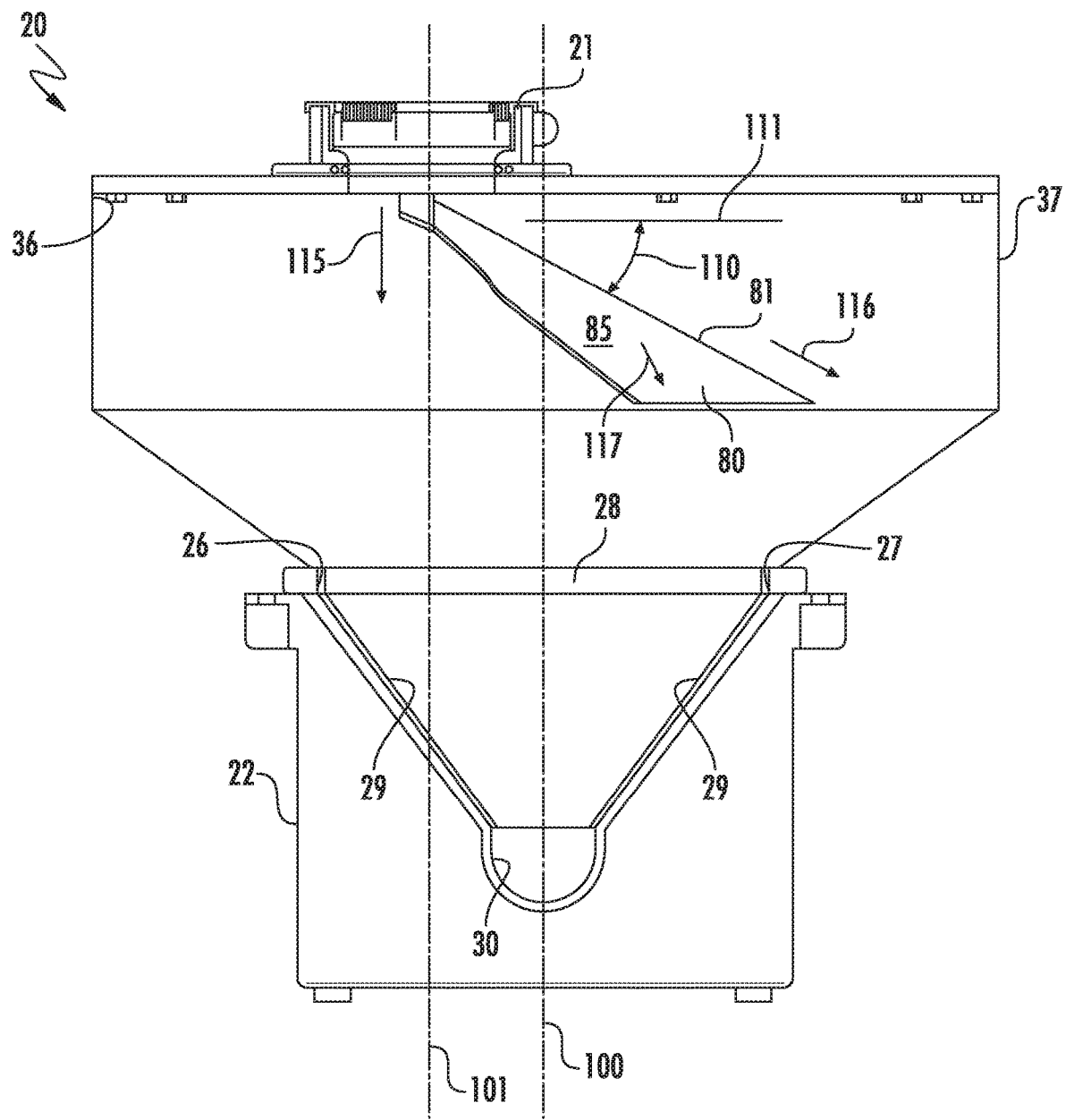
FIG. 7 is a sectional view taken generally along line 7-7 of FIG. 4.
Figure 8:
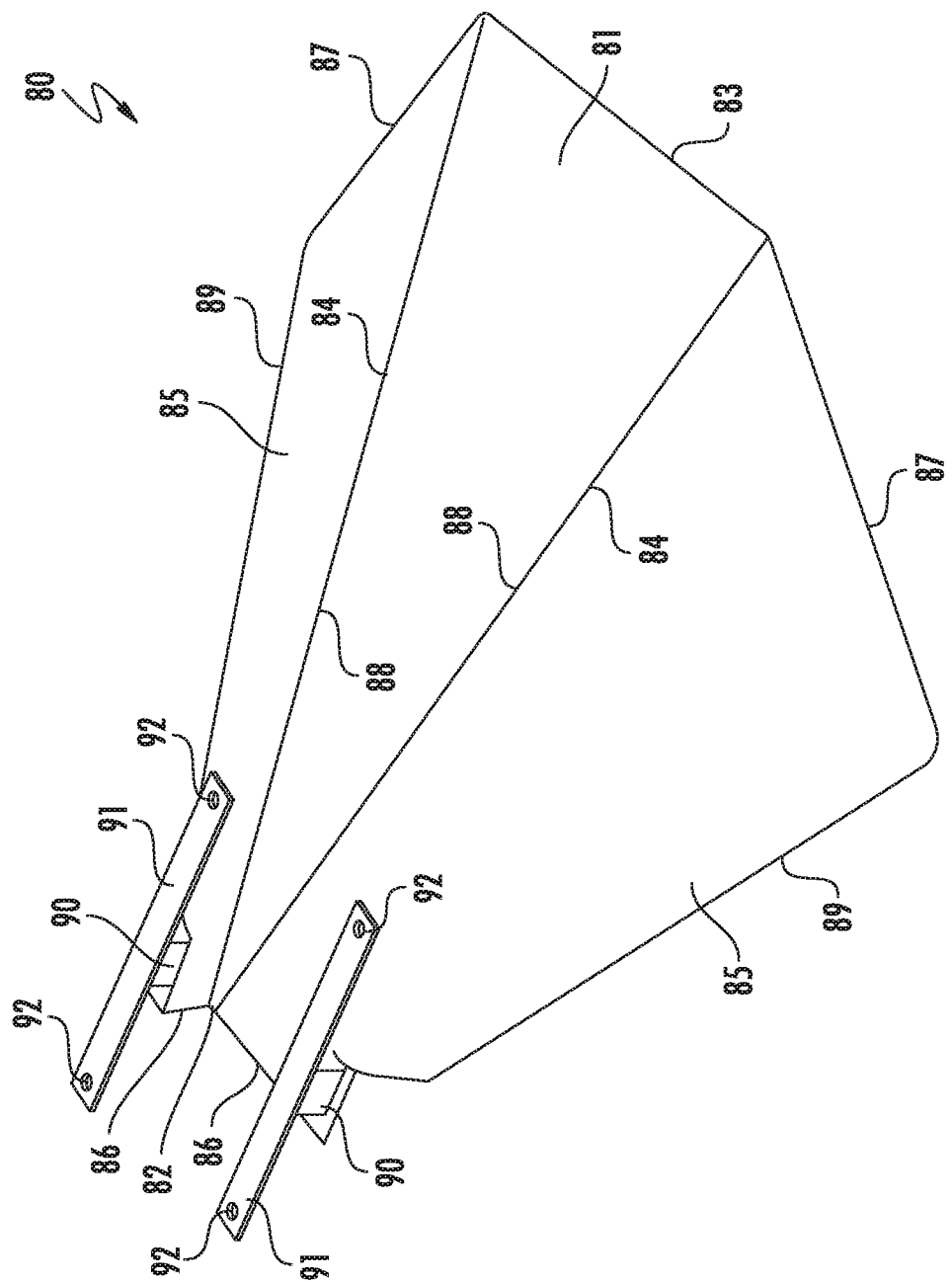
FIG. 8 is a perspective view of a diverter plate.
Figure 9:
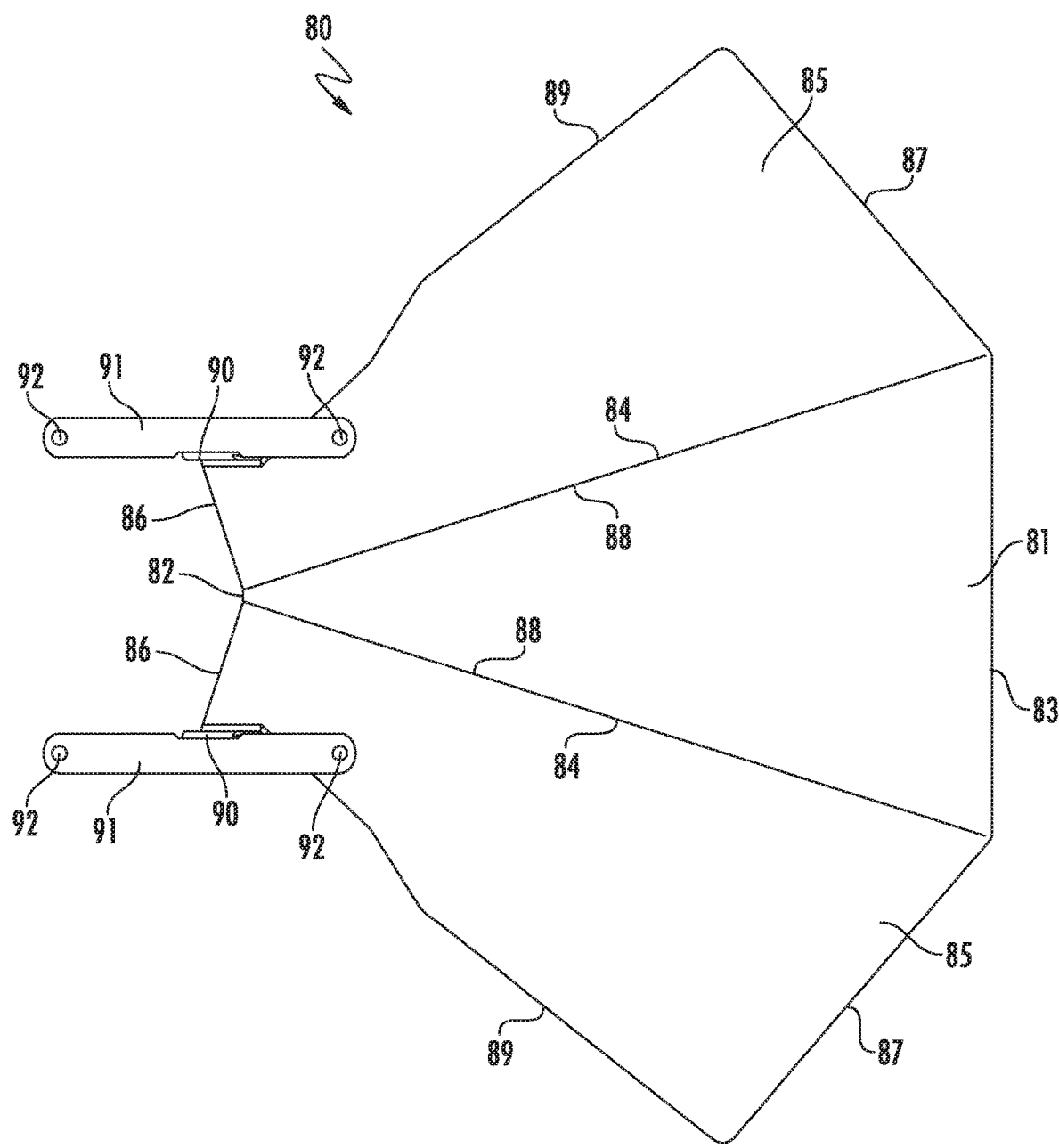
FIG. 9 is a top plan view of the diverter plate of FIG. 8.
Figure 10:
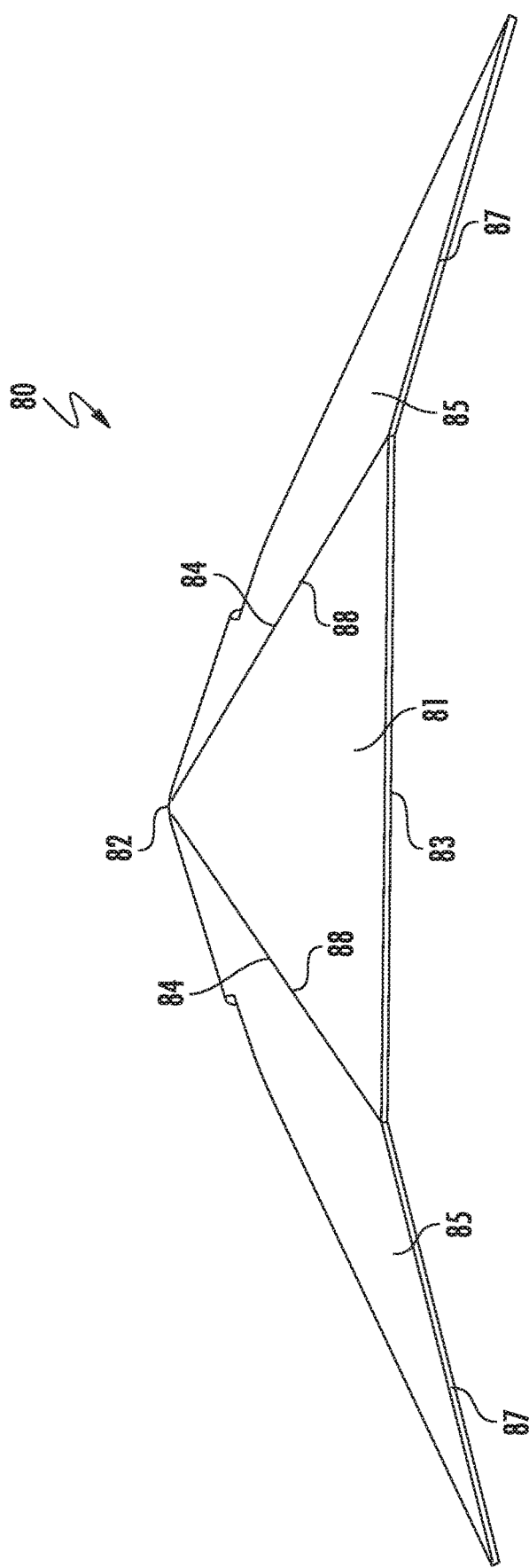
FIG. 10 is a perspective view of the diverter plate of FIG. 8 but from a second perspective.
Figure 11:
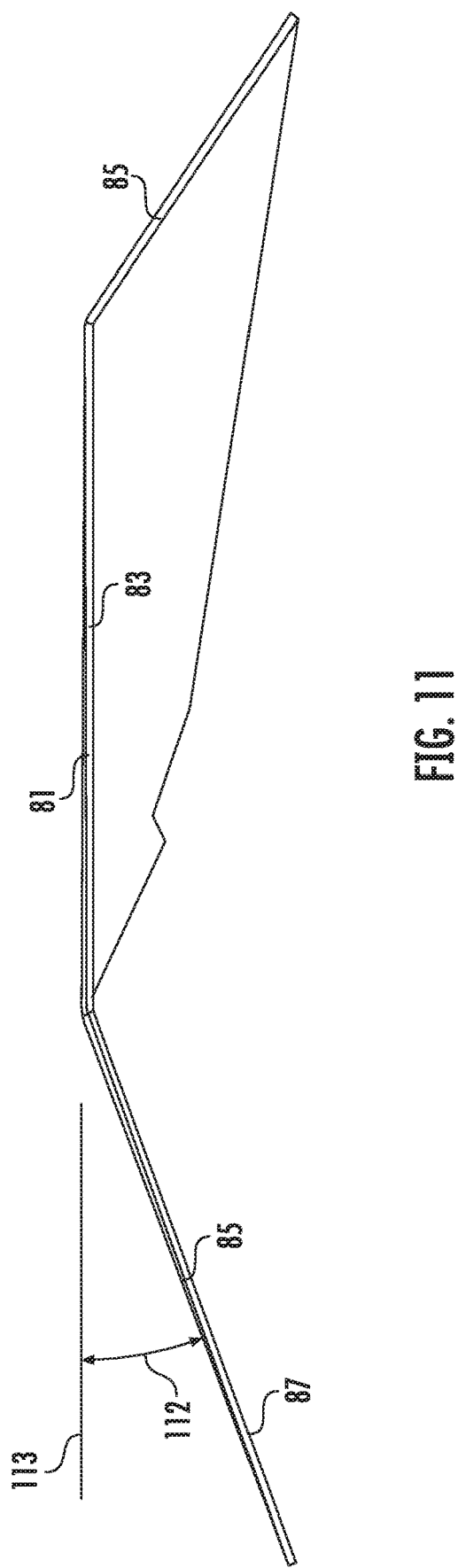
FIG. 11 is an end view of a portion of the diverter plate of FIG. 8 depicting the angle between the center section and one of the side sections.

The lower hopper 25 may have a reduced area feed section 30 at the bottom of the lower hopper and extending between the side edges 28. As depicted in FIG. 7, the reduced area feed section 30 may be configured as a semi-cylindrical portion (i.e., a semi-circular cross section). The sidewalls 29 of the lower hopper 25 are configured so that each of the sidewalls directs material to the feed section 30 in a uniform manner.

The hopper extension 35 includes a front or loading edge 36, a rear edge 37, opposite the front edge, and spaced apart lateral edges 38 extending between the front edge and the rear edge. The hopper extension 35 defines an upper rectangular section 40 and a lower sloped or tapered section 41. As depicted, the hopper extension 35 is formed of four sidewalls or sections with each extending along one of the edges. More specifically, a front or loading sidewall 42 includes a vertical rectangular section 43 extending downward from the loading edge 36 and a trapezoidal sloped section 44 that extends downwardly at an angle relative to the rectangular section 43. Similarly, a rear sidewall 45 includes a vertical rectangular section 46 extending downward from the rear edge 37 and a trapezoidal sloped section 47 that extends downwardly at an angle relative to the rectangular section 46. A pair of lateral sidewalls 48 each includes a vertical rectangular section 49 extending downward from one of the lateral edges 38 and a trapezoidal sloped section 50 that extends downwardly at an angle relative to the rectangular section 49.

Once assembled, the rectangular sections 43, 46, 49 define the upper rectangular section 40 and the trapezoidal sloped sections 44, 47, 50 define the lower tapered section 41. The lower tapered section 41 is configured to store powder material therein and direct material from the container 12 into the lower hopper 25. As with the lower hopper 25, each of the trapezoidal sloped sections 44, 47, 50 of the hopper extension 35 slopes downward in a constant or uniform manner and each of the trapezoidal sections is identically configured so that the tapered section 41 has a symmetrical shape. If desired, the trapezoidal sloped sections 44, 47, 50 may not have a constant or uniform slope and each of the trapezoidal sloped sections may not be identically shaped or configured.

The upper rectangular section 40 operates to store powder material therein and supply the powder material to the lower tapered section 41. Each of the rectangular sections 43, 46, 49 is identically configured so that the rectangular section 40 has a symmetrical shape. If desired, the rectangular sections 43, 46, 49 may not be identically shaped or configured.

The hopper 24 may be formed in any desired manner and may have any desired configuration. In some embodiments, the hopper 24 may include distinct upper and lower components such as lower hopper 25 and hopper extension 35. In some embodiments, the sloped sidewalls 29 of the lower hopper 25 may have a constant slope or inclination that is the same as those of the trapezoidal sloped sections 44, 47, 50 of the hopper extension 35. In other embodiments, the sloped sidewalls 29 of the lower hopper 25 may have a constant slope or inclination but be different from those of the trapezoidal sloped sections 44, 47, 50 of the hopper extension 35. Still further, in some embodiments, the slopes or inclinations of the sidewalls 29 and the trapezoidal sloped sections 44, 47, 50 may vary along their length and/or may be different from each other. Regardless of the configuration, the hopper 24 defines a material holding or storage capacity of the material feed system 20.

The hopper 24 includes a hopper axis 100 that extends vertically through the hopper and defines an axis about which powder material should be poured into the hopper to fill it to its maximum extent. In the hopper depicted in FIGS. 1-7, the hopper axis 100 extends through the horizontal center of the hopper in both an "x" direction and a "y" direction. In other words, the hopper axis 100 extends vertically halfway between the loading edge 26 and the rear edge 27 of the lower hopper 25 and halfway between its side edges 28. Still further, the hopper axis 100 extends vertically halfway between the loading edge 36 and the rear edge 37 of the hopper extension 35 and halfway between its lateral edges 38. If the lower hopper 25 and the hopper extension 35 were not symmetrical, the hopper axis 100 may not extend through the horizontal center of both the lower hopper and the hopper extension.

The material feed system 20 may further include a feed assembly 55 disposed at the feed section 30 of the lower hopper 25. As depicted, the feed assembly 55 is configured as an auger (not shown) that feeds powder material out of a material feed tube 56 and the feed section of the lower hopper 25 is configured in a complimentary manner (i.e., semi-cylindrical in shape) with a portion of the auger positioned therein. The material feed tube 56 may extend outward from or through a side wall 23 of housing 22.

The hopper extension 35 may be sealed with a cover 60 such as a transparent sheet of acrylic material. The cover 60 includes a front edge 61, a rear edge 62, opposite the front edge, and a pair of spaced apart side edges 63 extending between the front edge and the rear edge. An opening or hole 64 extends through the cover 60 and is offset from front to back so as to be positioned closer to the front edge 61 than the rear edge 62. The hole 64 may be centered between the side edges 63.

Figure 6:
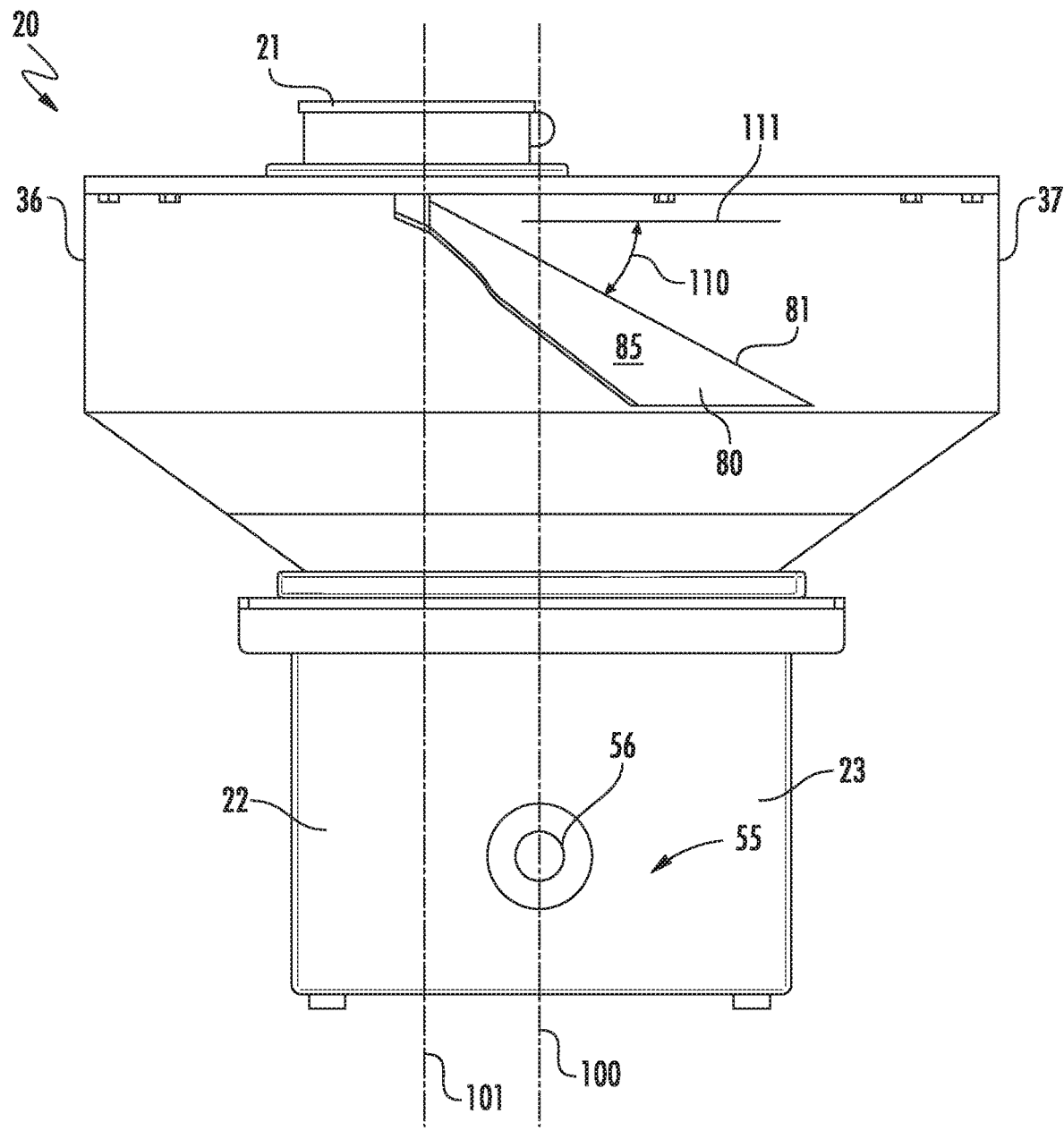
FIG. 6 is a side view of the material feed system of FIG. 2 with a portion of the upper hopper removed.

The docking station or base 21 is mounted or disposed on the cover 60 in any desired manner with the base 21 and hole 64 aligned. The hole 64 may be configured to correspond in shape (e.g., circular) and size to the opening within the base 21. The base 21 and hole 64 define a vertical mating or material loading axis 101 along which the container 12 is positioned during the process of loading material from the container into the hopper 24. As best seen in FIGS. 6-7, the hopper axis 100 extending vertically through the hopper 24 and the material loading axis 101 extending vertically through the cover 60 are offset or spaced apart from front to rear of the material feed system 20 with the material loading axis closer to the front edge than the rear edge.

In some embodiments, a mesh 65 may be disposed on the cover 60 aligned with the hole 64 and is configured with openings large enough to permit powder material to flow unimpeded from the container 12 but small enough to prevent foreign objects from falling into the hopper 24 if a container is not positioned on the base 21.

Referring back to FIG. 1, the material wetting system 70 includes a liquid supply system, generally indicated at 71, for supplying liquid such as water to a material wetting unit (not shown) at which the powder material is mixed with the liquid. The liquid supply system 71 includes a supply line or pipe 72 that feeds a liquid such as water to a booster pump 73. As depicted, the booster pump 73 is located below the housing 22 of the material feed system 20. The liquid is discharged from the booster pump 73 into an outlet pipe 74 which feeds the liquid to the material wetting unit. Powder material exits the material feed tube 56 and enters the material wetting unit where it is mixed with the liquid from the liquid supply system 71 to begin the wetting process. The mixture of powder material and liquid flows into tank 76 through line or pipe 77 extending between the material wetting unit 75 and the tank.

As best seen in FIGS. 6-7, the base 21 and the hole 64 in the cover 60 (and thus the material loading axis 101) are shifted towards the loading edge 36 of the hopper extension 35 relative to the center point between the loading edge and the rear edge 37 to reduce the distance that an operator must extend their arms when loading a container 12 onto the base 21. As a result, the material loading axis 101 is offset front to back relative to the hopper axis 100, which is centered relative to the hopper 24 as a result of the symmetrical nature of the hopper. In one example, the material loading axis 101 may be no more than approximately 9.5 inches from the loading edge 36. In another example, the material loading axis 101 may be no more than 4.5 inches from the loading edge 36.

As a result of the offset between the hopper axis 100 and the material loading axis 101, powder material may not completely and/efficiently filling the hopper extension 35, depending upon the characteristics (e.g., angle of repose) of the material. In order to improve the ability to fill the lower hopper 25 and hopper extension 35 as a result of the offset between the hopper axis 100 and the material loading axis 101, a diverter element or plate 80 is provided or disposed below the hole 64 in the cover 60 to alter or divert the flow of material as it enters the hopper extension. In other words, without the diverter plate 80, the offset between the hopper axis 100 and the material loading axis 101 may result in uneven filling of the hopper extension 35 as material flows through the hole 64 in the cover 60. When attempting to fill the depicted lower hopper 25 and hopper extension 35 with powder material, the powder material will fill the lower hopper 25 and may fill the lower tapered section 41 of the hopper extension 35 in a uniform manner. However, the upper rectangular section 40 may not be uniformly filled. As a result, without the diverter plate 80, the hopper extension 35 would need to be taller for a specified capacity of the hopper 24 (i.e., the combined capacity of the lower hopper 25 and the hopper extension 35) if other dimensions or angles are maintained.

Referring to FIGS. 8-11, the depicted diverter plate 80 includes a central section 81 and a pair of side sections 85, with one extending laterally from each side of the central section. Each of the central section 81 and the side sections 85 are generally planar and have diverging side edges. More specifically, central section 81 has an inward edge or tip 82, an oppositely facing outward edge 83, and a pair of oppositely facing side edges 84. The outward edge 83 is wider than the inward edge 82 and the side edges 84 extend between and diverge from the inward edge 82 to the outward edge 83.

Each side section 85 has an inward edge 86, an oppositely facing outward edge 87, and an inner side edge 88 and an oppositely facing outer side edge 89. The outward edge 87 is wider than the inward edge 86 and the side edges 88, 89 extend between and diverge from the inward edge 86 to the outward edge 83. The inner side edge 88 of each side section 85 extends from or is collinear with one of the side edges 84 of the central section 81.

The central section 81 extends downward at an angle 110 relative to a horizontal plane 111 as best seen in FIGS. 6-7. The angle 110 of the central section 81 may be set based upon any of a plurality of factors. For example, the angle 110 may be set based upon the angle of repose of the powder material as well as the dimensions and/or angles of the hopper extension 35 and the diverter plate 80. In the depicted embodiment, the angle 110 is approximately 28 degrees. In other embodiments, the angle 110 may be formed at an angle between 20 and 35 degrees. In still other embodiments, the angle 110 may be formed at an angle between 15 and 45 degrees. Still other angles may be utilized.

Each side section 85 is bent downward at an angle 112 relative to the plane 113 of the center section 81 along the intersection of outward edge 83 of center section and inner side edge 88 of each side section. The angle 112 of the side section 85 may be set based upon any of a plurality of factors. For example, the angle 112 may be set based upon the angle of repose of the powder material as well as the dimensions and/or angles of the hopper extension 35 and the diverter plate 80 including the center section 81. In other embodiments, the angle 112 may be formed at an angle between 15 and 25 degrees. In still other embodiments, the angle 112 may be formed at an angle between 10 and 30 degrees. Still other angles may be utilized.

The diverter plate 80 is depicted with three distinct sections or regions (center section 81 and the two side sections 85) that are formed by bending the diverter plate 80 along the outward edges 83 of the center section. However, the diverter plate 80 may be formed in other manners and with other configurations. For example, the diverter plate 80 may be formed with a continuous curve rather than the relatively abrupt changes in direction at each of the outward edges 83 of the center section 81.

The diverter plate 80 may be mounted relative to the material feed system 20 in any desired manner. In the depicted embodiment, the diverter plate 80 includes a pair of mounting legs 90 that extend upward from the side sections 85 adjacent the inward edge 86. A mounting flange 91 extends generally perpendicularly from each leg 90. The mounting flanges have a pair of bores 92 through which a fastener (not shown) such as a bolt may extend to secure the diverter plate 80 to the cover 60 with one mounting flange disposed on each side of the opening or hole 64. Other manners of securing the diverter plate 80 to the cover 60 or within the hopper extension 35 are contemplated.

Figure 5:
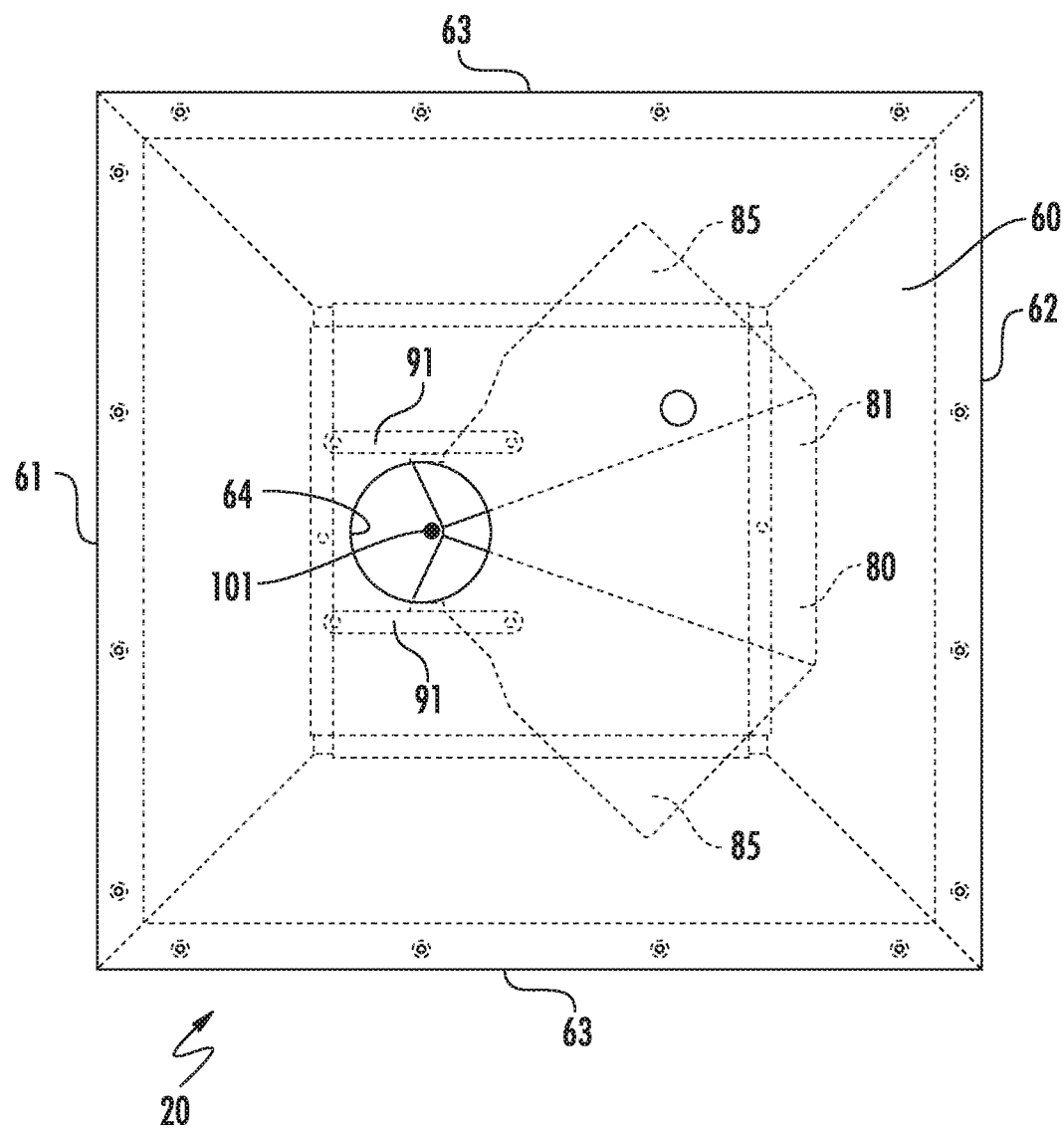
FIG. 5 is a top plan view similar to FIG. 4 with docking station and mesh removed for clarity.

The diverter plate 80 and the mounting flanges 91 are configured and disposed relative to the cover 60 so that the inward edge 82 of the central section 81 and the inward edges 86 of the side sections 85 are disposed below the hole 64 in the cover. Referring to FIG. 5, in the depicted embodiment, the inward edge 82 of the central section 81 generally coincides with or is disposed along the material loading axis 101. The inward edges 86 of the side sections 85 taper or extend at an angle away from the outward edge 83 of the central section 81.

As depicted, the diverter plate 80 occludes or blocks approximately 45 percent of the hole 64 in order to divert the flow of powder material along the diverter plate. Thus, as depicted in FIG. 7, a first portion of the flow of powder material from the container 12 depicted by arrow "115" can pass directly through the hole 64 and into the upper rectangular portion of the hopper extension 35 while a second portion of the flow of powder material will be diverted outward by the diverter plate 80 away from the hole. The second portion of the flow of powder material engages or contacts the diverter plate 80 so that a first fraction of the second portion of the flow is directed or travels along the center section 81, as depicted by arrow "116" (FIGS. 4, 7) and the rest of the second portion of the flow is directed or travels along the side sections 85, as depicted by arrows "117." By diverting the flow of powder material along the diverter plate 80, the powder material may fill the hopper 24 in a symmetrical (or more symmetrical) manner, which will permit the maximum (or a greater) amount of material to be loaded into the hopper.

In other embodiments, the diverter plate 80 may occlude or block more or less of the flow of powder material entering the hole 64 in the cover 60. In another embodiment, the diverter plate 80 may be positioned to block approximately 60 percent of the flow of material. In still another embodiment, the diverter plate may be positioned to block between approximately 20 and 80 percent of the flow of material. Other percentages of occlusion are contemplated.

In one example utilizing the hopper 24 and diverter plate 80 as depicted, the hopper with the diverter plate was capable of holding approximately seven percent more powder material than the hopper without the diverter plate. In order to increase the capacity of a new hopper without a diverter plate so that the same amount of powder material could be loaded therein as may be stored within the hopper 24 with the diverter plate 80, the new hopper would either need to be taller or wider. In some applications, increasing the height of the hopper 24 would be undesirable as it would require an operator to lift the containers 12 higher when loading the system 10. Further, in some applications, increasing the width of the hopper would be undesirable as it would result in an increase in the footprint of the system 10.

As will be appreciated, for a given configuration of the hopper 24 and a powder material having certain characteristics (e.g., the angle of repose), the manner in which the hopper is filled may be adjusted by adjusting the dimensions and angles of the sections of the diverter plate 80 and/or by adjusting the position of the diverter plate relative to the hole 64 in the cover 60.

As depicted, while the upper portion or hopper extension 35 of hopper 24 is depicted as being symmetrical, the concepts disclosed herein are applicable to systems utilizing asymmetrical upper portions or hopper extensions. In such case, the hopper 24 would fill in manner that may not maximize the amount of powder material it can store. Through the use of a diverter plate below the hole in the cover 60, the manner in which the hopper is filled can be modified.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hopper system for powder material, comprising:
   a hopper, the hopper having an upper end, a lower end, a plurality of hopper sidewalls, and a hopper axis, the hopper sidewalls extending downward from the upper end, at least one of the hopper sidewalls being sloped along a portion thereof, and the hopper axis extending vertically between at least some of the hopper sidewalls;
   a cover disposed at the upper end of the hopper, the cover including an opening configured for the powder material to flow through the opening and into the hopper, the opening defining a vertical material loading axis, the material loading axis being offset relative to the hopper axis;
   a diverter plate, the diverter plate including an inward edge and an outward edge, the diverter plate being stationarily mounted with the inward edge disposed below the opening of the cover and the diverter plate being disposed toward the hopper axis whereby a portion of the powder material flowing through the opening is diverted by the diverter plate and a portion of the powder material flowing through the opening flows directly into the hopper; and
   a powder material feed system, the powder material feed system being disposed adjacent the lower end of the hopper and being configured to feed the powder material from the hopper.

2. The hopper system of claim 1, wherein the hopper is symmetrically shaped.

3. The hopper system of claim 1, wherein the sidewalls of the hopper are symmetrically shaped.

4. The hopper system of claim 1, wherein the hopper comprises a front edge and a back edge, and the hopper axis is equidistant between the front edge and the back edge and the material loading axis is closer to the front edge than the back edge.

5. The hopper system of claim 1, wherein the hopper comprises an upper portion.

6. The hopper system of claim 5, wherein a portion of the powder material feed system is disposed within the lower portion of the hopper.

7. The hopper system of claim 1, wherein the inward edge extends across the opening of the cover.

8. The hopper system of claim 7, wherein the inward edge partially occludes the opening.

9. The hopper system of claim 1, wherein the diverter plate comprises a central portion with side edges and a pair of side portions, one of the side portions extending laterally from each side edge of the central portion.

10. The hopper system of claim 9, wherein the central portion extends downward at an angle relative to a horizontal plane.

11. The hopper system of claim 10, wherein the angle is between 15 and 45 degrees.

12. The hopper system of claim 9, wherein the side portions each extend downward at an angle relative to the central portion.

13. The hopper system of claim 12, wherein the angle is between 15 and 25 degrees.

14. A hopper system for powder material, comprising:
a hopper, the hopper having an upper end, a plurality of hopper sidewalls, and a hopper axis, the hopper sidewalls extending downward from the upper end, at least one of the hopper sidewalls being sloped along a portion thereof, and the hopper axis extending vertically between at least some of the hopper sidewalls;
a cover disposed at the upper end of the hopper, the cover including an opening configured for the powder material to flow through the opening and into the hopper, the opening defining a vertical material loading axis, the material loading axis being offset relative to the hopper axis; and
a diverter plate, the diverter plate including an inward edge and an outward edge, the diverter plate being stationarily mounted with the inward edge disposed below the opening of the cover and the diverter plate being disposed toward the hopper axis whereby a portion of the powder material flowing through the opening is diverted by the diverter plate and a portion of the powder material flowing through the opening flows directly into the hopper.

15. The hopper system of claim 14, wherein the hopper is symmetrically shaped.

16. The hopper system of claim 14, wherein the sidewalls of the hopper are symmetrically shaped.

17. The hopper system of claim 14, wherein the hopper comprises an upper portion and a lower portion.

18. The hopper system of claim 17, further including a powder material feed system configured to feed the powder material from the hopper, wherein a portion of the powder material feed system is disposed within the lower portion of the hopper.

19. The hopper system of claim 14, wherein the edge extends across the opening of the cover.

20. The hopper system of claim 19, wherein the inward edge partially occludes the opening.

* * * * *